United States Patent
Bleile et al.

(10) Patent No.: US 7,162,228 B2
(45) Date of Patent: Jan. 9, 2007

(54) APPARATUS, METHOD, MEDIA AND SIGNALS FOR CONTROLLING A WIRELESS COMMUNICATION APPLIANCE

(75) Inventors: Leonard George Bleile, Calgary (CA); Christopher Henry Becker, Calgary (CA); Mae Jennifer Mah, Calgary (CA)

(73) Assignee: Embedded Systems Products Inc., Calgary (CA)

( * ) Notice: Subject to any disclaimer, the term of this patent is extended or adjusted under 35 U.S.C. 154(b) by 508 days.

(21) Appl. No.: 10/114,485

(22) Filed: Apr. 3, 2002

(65) Prior Publication Data

US 2003/0190018 A1  Oct. 9, 2003

(51) Int. Cl.
*H04M 3/00* (2006.01)

(52) U.S. Cl. ............... 455/418; 455/414.1; 379/90.01

(58) Field of Classification Search ............ 455/3.03, 455/3.04, 3.06, 418, 419, 557, 569.1, 569.2, 455/575.1, 575.9; 379/420.1–420.04, 422, 379/424, 425, 422.01, 422.02, 422.04, 441, 379/433.01, 442

See application file for complete search history.

(56) References Cited

U.S. PATENT DOCUMENTS

| | | | |
|---|---|---|---|
| 4,150,254 A | 4/1979 | Schussler et al. | |
| 4,519,074 A | 5/1985 | Basile | |
| 4,658,096 A | 4/1987 | West, Jr. et al. | 379/59 |
| 4,737,975 A | 4/1988 | Shafer | 379/58 |
| 4,775,997 A | 10/1988 | West, Jr. et al. | 379/58 |
| 4,841,562 A | 6/1989 | Lem | |
| 4,887,290 A | 12/1989 | Dop et al. | |
| 4,899,370 A | 2/1990 | Kameo et al. | |
| 5,010,565 A | 4/1991 | Nash et al. | 379/61 |
| 5,117,450 A | 5/1992 | Joglekar et al. | 379/58 |
| 5,128,987 A | 7/1992 | McDonough et al. | |
| 5,138,649 A | 8/1992 | Krisbergh et al. | |
| 5,185,779 A | 2/1993 | Dop et al. | |
| 5,333,177 A | 7/1994 | Braitberg et al. | 379/59 |
| 5,349,638 A | 9/1994 | Pitroda et al. | |
| 5,349,688 A | 9/1994 | Nguyen | |
| 5,353,331 A | 10/1994 | Emery et al. | |
| 5,420,907 A | 5/1995 | Shapiro | |
| 5,420,913 A | 5/1995 | Hashimoto | |
| 5,526,403 A | 6/1996 | Tam | 379/59 |
| 5,528,673 A | 6/1996 | Rosenthal | |
| 5,535,274 A * | 7/1996 | Braitberg et al. | 379/446 |
| 5,544,227 A | 8/1996 | Blust et al. | |
| 5,555,258 A | 9/1996 | Snelling et al. | |
| 5,592,064 A | 1/1997 | Morita | |
| 5,600,711 A | 2/1997 | Yuen | |

(Continued)

FOREIGN PATENT DOCUMENTS

GB        2365266 A      2/2002

(Continued)

OTHER PUBLICATIONS

Silicon Laboratories Inc., Si3210 ProSLIC™, pp. 1-2, Silicon Laboratores Inc., Austin, TX, USA (Published at least as early as Jan. 2000).

*Primary Examiner*—Ovidio Escalante

(57) ABSTRACT

Apparatus, method, media and signals for controlling a wireless communication appliance are disclosed. A method implemented by the apparatus, media and signals involves producing a message signal comprising an address portion and a payload portion, in response to an action signal received at an adjunct apparatus, causing the adjunct apparatus to perform a function identified in the payload portion when the address portion satisfies a condition and transmitting the message signal to the wireless communication appliance when the address portion fails to satisfy the condition.

46 Claims, 7 Drawing Sheets

U.S. PATENT DOCUMENTS

| | | | |
|---|---|---|---|
| 5,603,078 A | 2/1997 | Henderson et al. | |
| 5,612,990 A | 3/1997 | Meier et al. | |
| 5,666,399 A | 9/1997 | Bales et al. | |
| 5,671,267 A | 9/1997 | August et al. | |
| 5,696,815 A | 12/1997 | Smyk | |
| 5,706,334 A | 1/1998 | Balk et al. | |
| 5,714,943 A | 2/1998 | Rasor | |
| 5,715,296 A | 2/1998 | Schornack et al. | 379/58 |
| 5,727,053 A | 3/1998 | Sizer II et al. | |
| 5,751,789 A | 5/1998 | Farris et al. | |
| 5,754,546 A | 5/1998 | Voit et al. | |
| 5,754,641 A | 5/1998 | Voit et al. | |
| 5,802,468 A | 9/1998 | Gallant et al. | 455/422 |
| 5,805,677 A | 9/1998 | Ferry et al. | |
| 5,805,682 A | 9/1998 | Voit et al. | |
| 5,812,637 A | 9/1998 | Schornack et al. | 379/59 |
| 5,818,197 A | 10/1998 | Miller et al. | |
| 5,822,427 A | 10/1998 | Braitberg et al. | 379/454 |
| 5,870,155 A | 2/1999 | Erlin | |
| 5,870,453 A | 2/1999 | Shapiro | |
| 5,877,565 A | 3/1999 | Hollenbach et al. | 307/119 |
| 5,898,931 A | 4/1999 | I'Anson et al. | |
| 5,903,850 A * | 5/1999 | Huttunen et al. | 455/557 |
| 5,913,176 A | 6/1999 | Barabash | 455/560 |
| 5,937,038 A | 8/1999 | Bell et al. | |
| 5,946,616 A | 8/1999 | Schornack et al. | 455/422 |
| 5,953,676 A | 9/1999 | Berry et al. | |
| 5,999,620 A | 12/1999 | Pinel et al. | 379/428 |
| 6,073,031 A | 6/2000 | Helstab et al. | 455/557 |
| 6,091,758 A | 7/2000 | Ciccone et al. | |
| 6,128,504 A | 10/2000 | Ciccone | |
| 6,205,326 B1 | 3/2001 | Tell et al. | 455/406 |
| 6,212,377 B1 | 4/2001 | Dufour et al. | |
| 6,366,784 B1 | 4/2002 | Hsueh | |
| 6,400,957 B1 | 6/2002 | Rodrigues et al. | |
| 6,424,840 B1 | 7/2002 | Fitch et al. | 455/456 |
| 6,466,799 B1 | 10/2002 | Torrey et al. | |
| 6,480,714 B1 | 11/2002 | DePani et al. | |
| 6,487,403 B1 | 11/2002 | Carroll | |
| 6,526,287 B1 * | 2/2003 | Lee | 455/556.1 |
| 6,636,749 B1 * | 10/2003 | Holmes et al. | 455/569.2 |
| 6,674,358 B1 * | 1/2004 | Tinsley | 340/7.63 |
| 6,714,796 B1 * | 3/2004 | Mizukoshi et al. | 455/550.1 |
| 6,836,644 B1 * | 12/2004 | Bacon et al. | 455/74.1 |
| 6,865,403 B1 * | 3/2005 | Averkamp | 455/564 |
| 6,889,065 B1 * | 5/2005 | Holmes et al. | 455/569.2 |
| 2002/0009991 A1 | 1/2002 | Lu et al. | |
| 2002/0025832 A1 | 2/2002 | Durian et al. | |
| 2003/0190018 A1 * | 10/2003 | Bleile et al. | 379/67.1 |

FOREIGN PATENT DOCUMENTS

| | | |
|---|---|---|
| GB | 2365266 A | 2/2002 |
| WO | 0215542 A2 | 2/2002 |
| WO | WO 0215542 A | 2/2002 |

* cited by examiner

APPARATUS, METHOD, MEDIA AND SIGNALS FOR CONTROLLING A WIRELESS COMMUNICATION APPLIANCE

BACKGROUND OF THE INVENTION

1. Field of Invention

This invention relates to wireless communication appliances and more particularly to apparatus, method, media and signals for controlling a wireless communication appliance.

2. Description of Related Art

There has been a rapid increase in mobile telephone usage as manufacturers have overcome many technical problems associated therewith, including extension of battery life and convenience.

Despite overcoming these technical problems, the increasing usage of mobile telephones is impeded by the inherent resistance of some people to change and accept new technologies. Many people still prefer to use conventional landline telephones despite the availability of better features on mobile telephones as compared to the features available to conventional landlines and to the telephones connected thereto. This greater feature set may include two-way messaging and/or predictive text entry, for example. Feature sets available to conventional landlines are generally applied to the line and not to individual telephone appliances connected to the line. Thus, those who do not make use of mobile telephones generally do not enjoy the features of such telephones.

One reason that people are reluctant to adopt mobile telephones is due to the fact that mobile telephones have a form factor that is designed for mobility. Reduced size, for example, facilitates mobility. However, reductions in size are made at the expense of ease of use. For example, keypad buttons and displays are smaller on mobile telephones than on landline based telephones. In addition, the housings of mobile telephones often act as the handset and are much smaller and less optimized for audio quality than handsets of landline based telephones. Considerable expenditures of research time and money have gone into optimizing the acoustics and ergonomics of landline based handsets since the inception of the telephone in the late 1800's. Much of this optimization has been discarded by present mobile telephone designs.

Another deterrent to the use of mobile telephones is the apparently unresolved issue of whether or not radiation produced by mobile telephones is harmful. Some potential users prefer not to take the risk.

Another deterrent to mobile telephone use is the difficulty experienced when using user response systems that require the entry of passcodes. When using such a system, the user of a mobile telephone typically moves the mobile telephone back and forth, toward and away from the user's ear, so that the user can see and access the keypad, which is usually positioned adjacent an earpiece of the mobile telephone.

Some people, particularly older people, find mobile telephones awkward and uncomfortable to use, due to lack of familiarity. Many people are simply more comfortable using conventional landline based telephones due to the better ergonomics of such telephones, as compared to the ergonomics of mobile telephones. In addition, appliances for the sight impaired or hearing impaired are more readily available for landline based telephones. Further, the impaired have greater familiarity with landline based telephones.

In the past, landline telephones have been connected to mobile telephones using subscriber line interface circuits which require a 4 to 2 wire conversion and a 2 to 4 wire conversion in the voice path. This requires hybrid circuits and requires a high voltage battery feed and a ringing circuit. These create unnecessary complexity.

With the plethora of wireless communication appliances available to consumers today, each manufacturer of wireless communication appliances is faced with the above problems for generally all wireless communication appliance products it produces. Thus, each manufacturer may be required to address each of the above problems for each of its products in order to increase its market share.

What would be desirable is a simple way of providing wireless communication appliance features to users, in a landline-based form easily adaptable to a plurality of different wireless communication appliances.

SUMMARY OF THE INVENTION

In accordance with one aspect of the invention there is provided a method of controlling a wireless communication appliance. The method involves producing a message signal comprising an address portion and a payload portion, in response to an action signal received at an adjunct apparatus, causing the adjunct apparatus to perform a function identified in the payload portion when the address portion satisfies a condition and transmitting the message signal to the wireless communication appliance when the address portion fails to satisfy the condition.

The method may further comprise receiving the action signal at the adjunct apparatus and receiving may comprise receiving the action signal from a remote device and/or from a remote computer.

The method may further comprise producing the action signal at the adjunct apparatus and this may involve detecting actuation of a switch at the adjunct apparatus. Producing the action signal may comprise detecting engagement of the wireless communication appliance with a receptacle on the adjunct apparatus and producing the message signal may comprise producing a message signal having an address portion that does not meet the condition and having a payload portion representing a command operable to cause the wireless communication appliance to transmit a home signal to indicate that the wireless communication appliance is engaged with the receptacle.

A command operable to control the wireless communication appliance may be included in the payload portion. The command may be operable to cause the wireless communication appliance to perform a function operable to be invoked by an actuator on the wireless communication appliance.

Transmitting the message signal may comprise causing electrical signals to be produced at a control interface of the wireless communication appliance. Alternatively, or in addition transmitting the message signal may comprise causing electromagnetic energy to be radiated for reception by the wireless communication appliance.

The method may further comprise receiving the action signal from the wireless communication appliance and this may involve receiving an indicator signal from the wireless communication appliance.

Producing a message signal may involve producing a message signal such that the address portion satisfies the condition and such that the payload portion identifies a function that causes the adjunct apparatus to actuate an indicator on the adjunct apparatus to indicate information received from the wireless communication appliance.

Producing a message signal may involve producing a message signal such that the address portion does not satisfy the condition and such that the message signal has a payload portion identifying a function that causes the wireless communication appliance to employ a predictive text engine thereof. The method may further involve actuating the indicator at the adjunct apparatus and actuating the indicator may comprise actuating a light emitting device on the adjunct apparatus, actuating a display on the adjunct apparatus and/or actuating a sound producing device on the adjunct apparatus.

In accordance with another aspect of the invention there is provided an adjunct apparatus for a wireless communication appliance. The apparatus comprises a message signal generator operable to produce a message signal comprising an address portion and a payload portion, in response to an action signal received at the adjunct apparatus, a functional block operable to perform a function indicated by the payload portion when the address portion satisfies a condition and a transmitter operable to transmit the message signal to the wireless communication appliance when the address portion fails to satisfy the condition.

The apparatus may further comprise a receiver operable to receive the action signal at the adjunct apparatus. The receiver may be operable to receive the action signal from a remote device such as a remote computer.

The apparatus may further comprise a signal generator operable to produce the action signal at the adjunct apparatus. The signal generator may comprise a switch.

The apparatus may comprise a base having a receptacle for engaging the wireless communication appliance and the base may have an appearance of a landline telephone base. The apparatus may further comprise an adjunct handset operable to interface with a voice path in the wireless communication appliance to permit the handset to be used as an alternative to a handset in the wireless communication appliance. The base may have a handset receptacle for receiving and holding the adjunct handset.

The message signal generator may comprise a detector operable to detect engagement of the wireless communication appliance with the receptacle. The message signal generator may be operable to produce a message signal having an address portion that does not meet the condition and having a payload portion representing a command operable to cause the wireless communication appliance to transmit a home signal to indicate that the wireless communication appliance is engaged with the receptacle.

The message signal generator may be operable to include in the payload portion a command operable to control the wireless communication appliance.

The message signal generator may be operable to include in the payload portion a representation of command operable to cause the wireless communication appliance to perform a function operable to be invoked by an actuator on the wireless communication appliance.

The apparatus may comprise an interface in communication with the transmitter and operable to engage with a control interface of the wireless communication appliance to cause electrical signals representing the message signal to be produced at the control interface. The transmitter may comprise an electromagnetic transmitter operable to radiate electromagnetic energy representing the message signal, for reception by the wireless communication appliance.

The apparatus may comprise a receiver operable to receive the action signal from the wireless communication appliance and the receiver may be operable to receive an indicator signal from the wireless communication appliance.

The message signal generator may be operable to produce a message signal such that the address portion satisfies the condition and such that the payload portion identifies a function that causes the adjunct apparatus to actuate an indicator at the adjunct apparatus to indicate information received from the wireless communication appliance.

The message signal generator may be operable to produce a message signal having an address portion that does not satisfy the condition and having a payload portion identifying a function that causes the wireless communication appliance to employ a predictive text engine thereof.

The apparatus may further comprise an indicator operable to indicate information received from the wireless communication appliance. The indicator may comprise a light emitting device on the adjunct apparatus and/or a display on the adjunct apparatus and/or a sound producing device on the adjunct apparatus.

In accordance with another aspect of the invention there is provided an adjunct apparatus for controlling a wireless communication appliance, the apparatus including a device for producing a message signal comprising an address portion and a payload portion, in response to an action signal received at an adjunct apparatus, a device for causing the adjunct apparatus to perform a function identified in the payload portion when the address portion satisfies a condition and a device for transmitting the message signal to the wireless communication appliance when the address portion fails to satisfy the condition.

In accordance with another aspect of the invention there is provided a computer readable medium for providing codes operable to direct a processor circuit to control a wireless communication appliance, by producing a message signal comprising an address portion and a payload portion, in response to an action signal received at an adjunct apparatus, performing a function identified in the payload portion when the address portion satisfies a condition and transmitting the message signal to the wireless communication appliance when the address portion fails to satisfy the condition.

In accordance with another aspect of the invention there is provided a signal representing codes for directing a processor circuit to control a wireless communication appliance. The signal may have a first segment for directing the processor circuit to produce a message signal comprising an address portion and a payload portion, in response to an action signal received at an adjunct apparatus, a second segment for directing the processor circuit to perform a function identified in the payload portion when the address portion satisfies a condition and a third segment for directing the processor circuit to transmit the message signal to the wireless communication appliance when the address portion fails to satisfy the condition.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
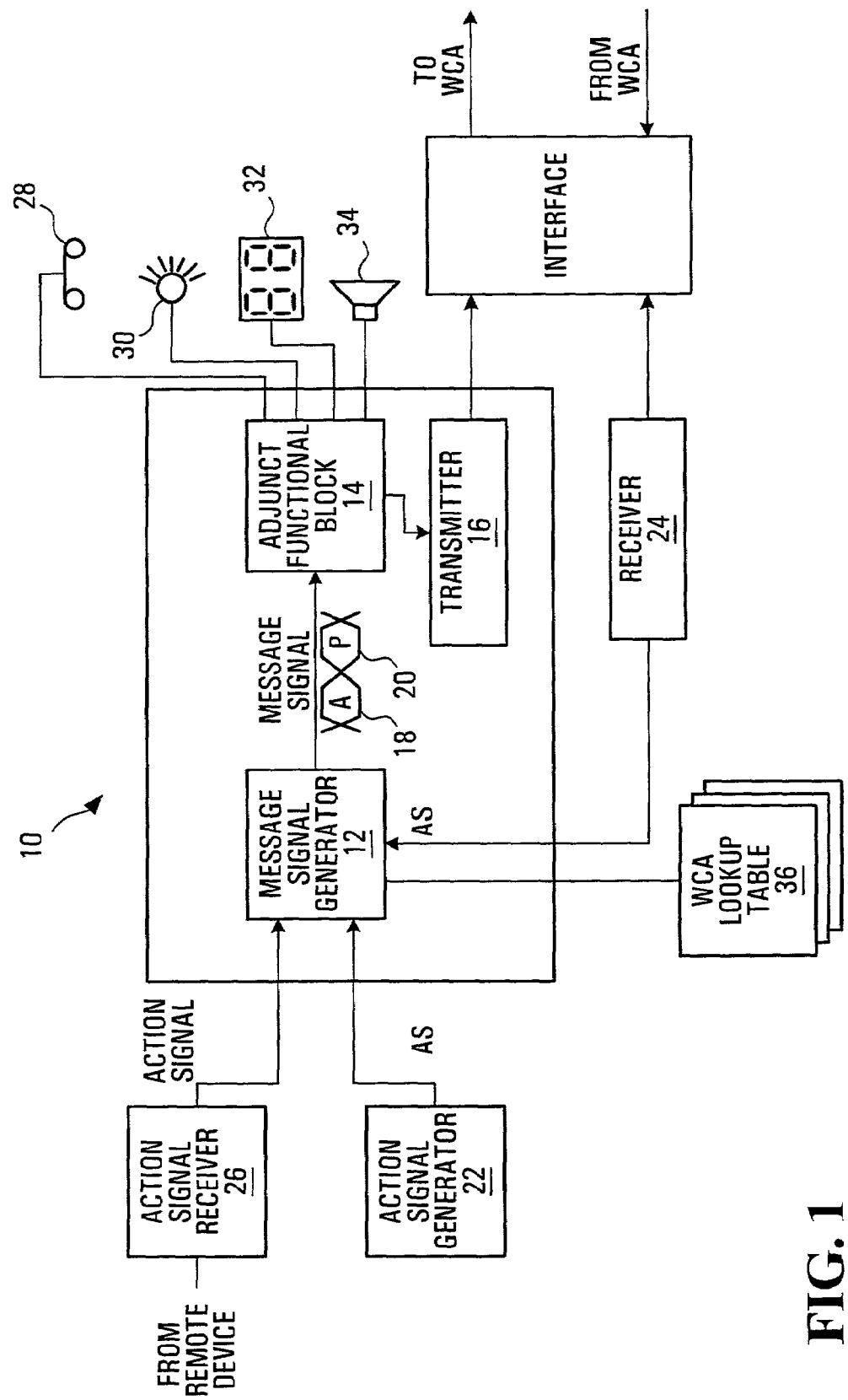
FIG. 1 is a block diagram of an apparatus according to a first embodiment of the invention.

Referring to FIG. 1, an adjunct apparatus for a wireless communication appliance (WCA), such as a cellular telephone, or personal data organizer, for example, is shown generally at 10. The adjunct apparatus 10 comprises a message signal generator 12, an adjunct function al block 14 and a transmitter 16. The message signal generator 12 is operable to produce a message signal comprising an address portion 18 and a payload portion 20 in response to an action signal received at the adjunct apparatus. The action signal may be received from any of a plurality of devices including a remote device, such as a laptop computer for example (not shown), an action signal generator 22 possibly located at the adjunct apparatus, or a receiver 24 operable to receive signals from the WCA.

An action signal from a remote device may be received by an action signal receiver 26 which buffers and formats the action signal for receipt by the message signal generator 12. An action signal from a remote device may represent certain commands issued by the remote device, for example. An action signal generated by the action signal generator 22, may represent key presses or switch actuations, for example, at the adjunct apparatus 10. An action signal received from the WCA may include information about the status of a call currently in progress on the WCA, where the WCA is a telephone, for example.

The adjunct functional block 14 serves to perform a function indicated by the payload portion 20 of the message signal when the address portion 18 thereof satisfies a condition. For example, the address portion 18 may represent a home address or an away address and when it represents a home address, the adjunct functional block 14 is rendered operational to perform the function specified by the payload portion 20, at the adjunct apparatus 10. The specified function may be to connect a handset 28 to a voice path (not shown) of the WCA, or it may be to actuate an indicator 30 with information supplied by the WCA or it may be to actuate a display 32 with information from the WCA or it may be to actuate a speaker 34 with information from the WCA, for example.

When the address portion 18 does not satisfy the condition, the message signal is supplied to the transmitter 16, which transmits the message signal to the WCA.

While the above description has referred to a message signal, it will be appreciated that more than one message signal may be produced. For example, the message signal may include a separate address signal operable to control whether or not separate payload signals representing the payload portion of the message are provided to the adjunct functional block or the transmitter 16. The address signal may be used to control a demultiplexer, for example, for directing the payload signals to either the adjunct functional block or the transmitter. Generally, the address signal acts to control a selector for selecting the recipient of the payload signals.

Effectively, the adjunct apparatus 10 permits action signals from any of a variety of different sources to cause the message signal generator 12 to produce a message signal in a common format recognizable by the adjunct functional block 14 or by the WCA. For example, when the address portion 18 satisfies the d the payload portion 20 may represent commands for controlling different functions operable to be performed by the adjunct functional block 14. Similarly, when the address portion 18 is set to fail to satisfy the condition, the payload portion 20 may represent commands recognizable by the WCA.

The message signal generator 12, may have access to a look-up table shown generally at 36, or a plurality of look-up tables, where each table provides a listing of commands available for use with different WCAs thereby allowing the adjunct apparatus 10 to be used with any of a plurality of different WCAs of the same manufacturer or different manufacturers.

Figure 2:
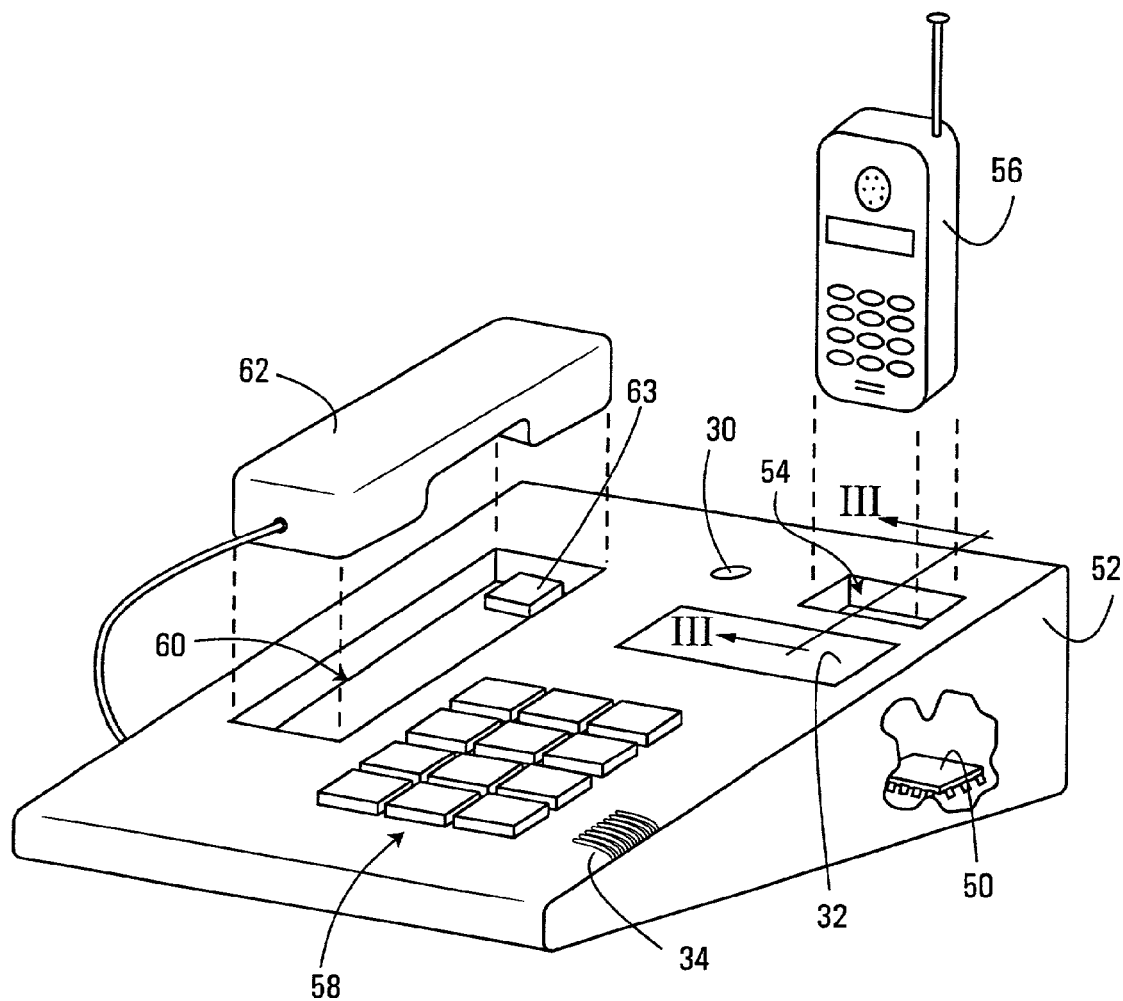
FIG. 2 is a perspective view of the apparatus shown in FIG. 1.

Referring to FIG. 2, in one embodiment, the apparatus may be implemented in a processor circuit 50 housed in a base 52 having the appearance of a landline telephone base. The processor circuit 50 may be incorporated into a single chip microprocessor circuit, it may include a plurality of microprocessors or microcontrollers, it may be implemented in a collection of integrated circuits or it may be implemented in discrete components, for example. The base 52 may have a receptacle such as shown generally at 54 for engaging a WCA 56 which, in this embodiment, is shown as a cellular telephone having a built-in handset. Alternatively, the receptacle may be omitted and the base 52 may have a wire extending therefrom for direct connection to the WCA. Or, the WCA may be placed in communication with the processor circuit 50 by any Radio Frequency (RF) communications link, such as a Bluetooth™ communications link, for example. (Bluetooth is a trade-mark of Bluetooth SIG Inc.) The indicator 30, the display 32 and the speaker 34 shown in FIG. 1 may be mounted on the base 52, for example, and may be in communication with the processor circuit 50. A keypad shown generally at 58 may be mounted on the base 52 and may cooperate with the action signal generator 22 shown in FIG. 1 which may also be implemented within the processor circuit 50.

The base 52 may further have a handset receptacle shown generally at 60 for receiving and holding an adjunct handset 62 having a shape and appearance of a conventional landline based telephone handset such as a Norstar® telephone provided by Nortel Networks Limited of Montreal, Canada. Alternatively, the adjunct handset 62 may include a headset.

In this embodiment, the adjunct handset 62 is of the hand-held type and may be large enough to fully extend between an adult user's ear and mouth, as opposed to the relatively short distance between the transmitter and receiver on a conventional cellular telephone. The adjunct handset 62 is in communication with the processor circuit 50 to interface with a voice path of the WCA 56 to permit the adjunct handset to be used as an alternative to the built-in handset in the WCA. An adjunct handset detector 63 such as a mechanically actuated switch may be incorporated into the handset receptacle 60 to produce a signal indicative of whether or not the adjunct handset 62 is in the handset receptacle 60, much like a hook switch of a conventional landline telephone base.

Alternatively, the adjunct handset 62 may be placed in communication with the processor circuit 50 by any Radio Frequency (RF) communications link, such as a Bluetooth™ communications link like the one mentioned above, for example. Components implementing the RF wireless communications link may act as the adjunct handset detector 63 to produce a signal indicative of whether or not the adjunct handset 62 is in operation or not, instead of indicating whether or not the adjunct handset is in the receptacle 60.

Figure 3:
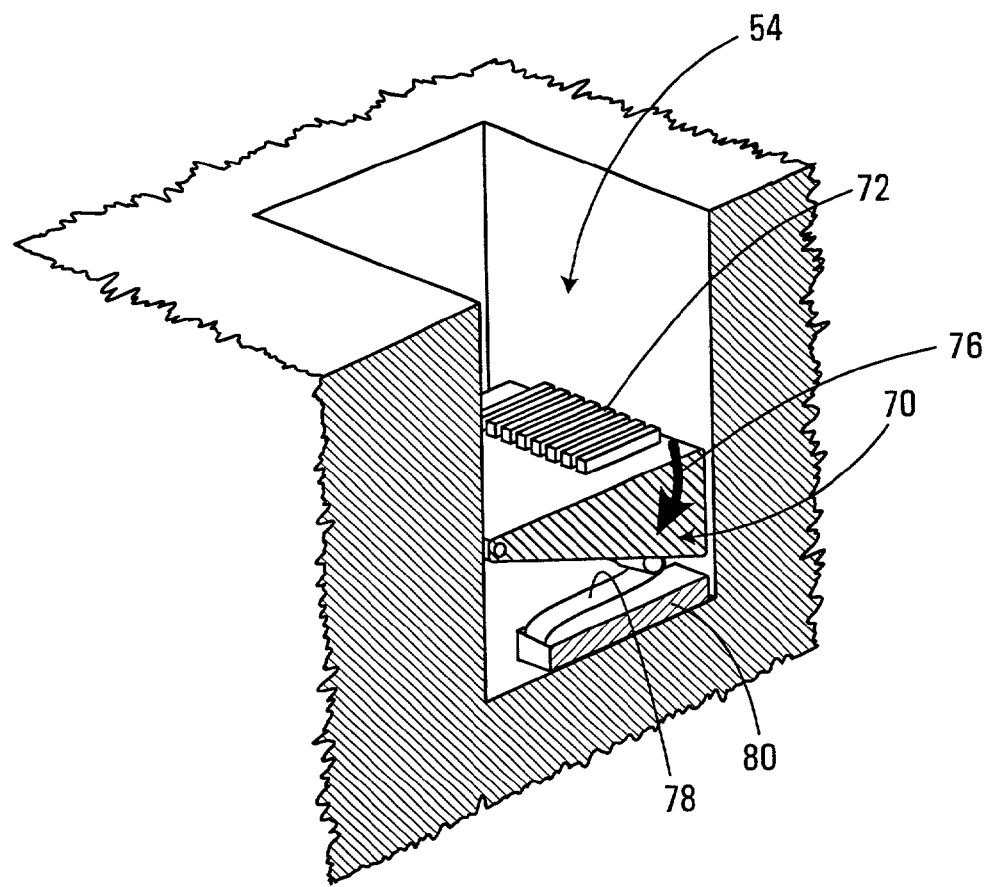
FIG. 3 is a broken perspective detail of a wireless communication appliance receptacle of the apparatus, sectioned along lines III—III in FIG. 2.

Referring to FIG. 3, the receptacle 54 for receiving the WCA is shown in greater detail. In this embodiment, the receptacle has a pivotal flap 70 to which is mounted a plurality of contacts 72 for engaging contacts of a control interface 74 of the WCA 56 as shown best in FIG. 4. The contacts on the control interface 74 mate with corresponding respective contacts 72 on the pivotal flap 70 shown in FIG. 3 when the WCA 56 is in the receptacle 54. The pivotal flap 70 is operable to pivot in a clockwise direction as shown by arrow 76 in FIG. 3 to actuate a WCA detector which in this embodiment includes an actuator 78 of a micro switch 80 connected to the processor circuit 50 shown in FIG. 2. In effect, the flap 70 and the micro switch 80 together act as a detector operable to detect engagement of the WCA with the receptacle 54. Detection of the WCA 56 in the receptacle 54 is achieved by the weight of the WCA causing the flap 70 to rotate in the direction of arrow 76 to actuate the micro switch 80 thereby causing the micro switch 80 to produce an action signal which is received by the message signal generator 12 of FIG. 1 implemented within the processor circuit 50 shown in FIG. 2.

Figure 5:
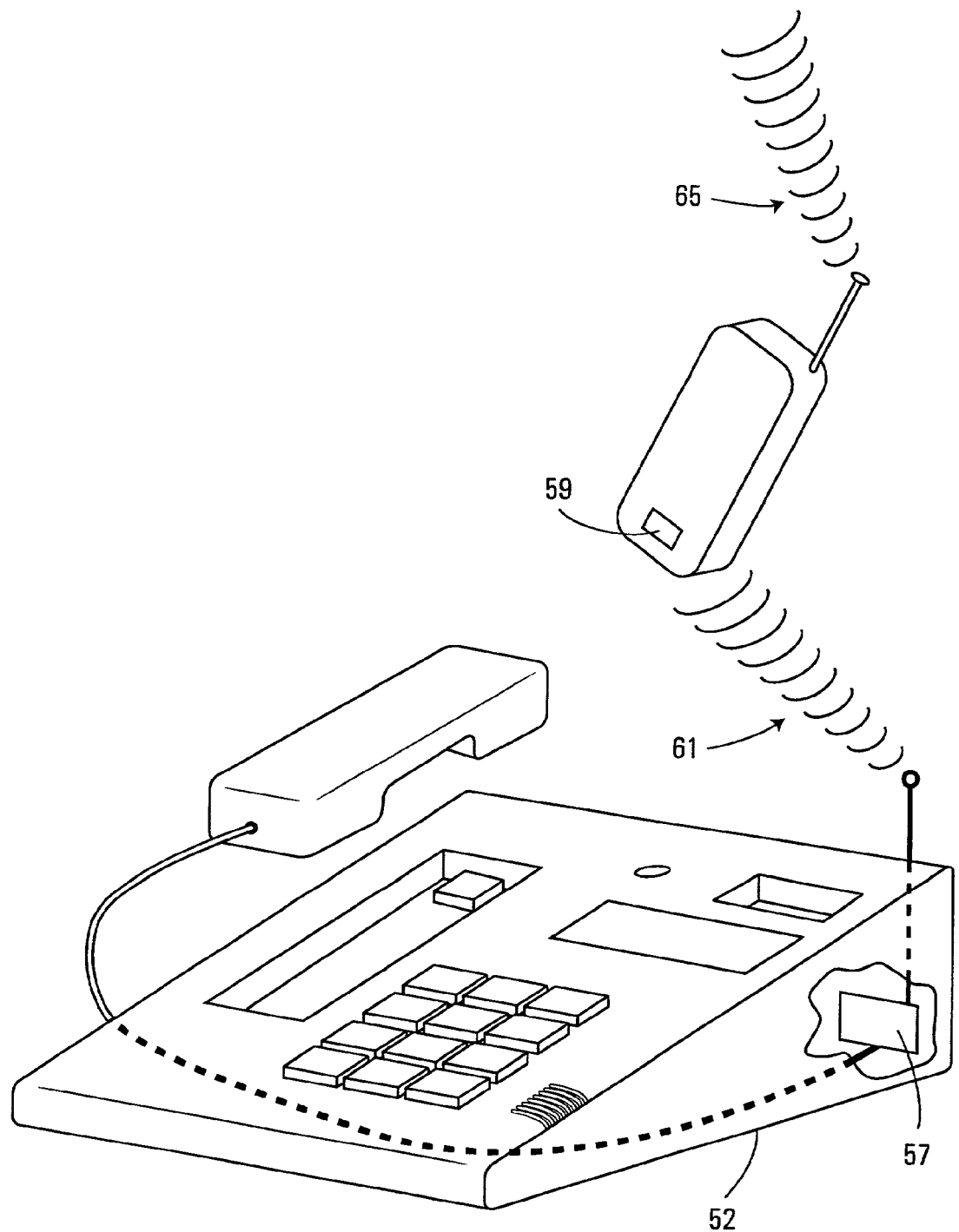
FIG. 5 is a schematic representation of an apparatus according to an alternate embodiment of the invention.

Referring to FIG. 5 as mentioned above, alternatively the base may be provided with a Radio Frequency Communications link including a wireless communication transceiver 57 in the base and a wireless communication transceiver 59 in the WCA to permit a separate wireless communication link 61 to be established between the WCA and the base 52. This separate link 61 is separate from the link 65 established between the WCA and a public network bay station (not shown). The separate link 61 may be provided by transceivers 57 and 59 operating in accordance with the Bluetooth™ specification mentioned above. This link effectively replaces the contacts 72 and 74 and permits the same information to be communicated between the WCA 56 and the base 52.

Figure 6:
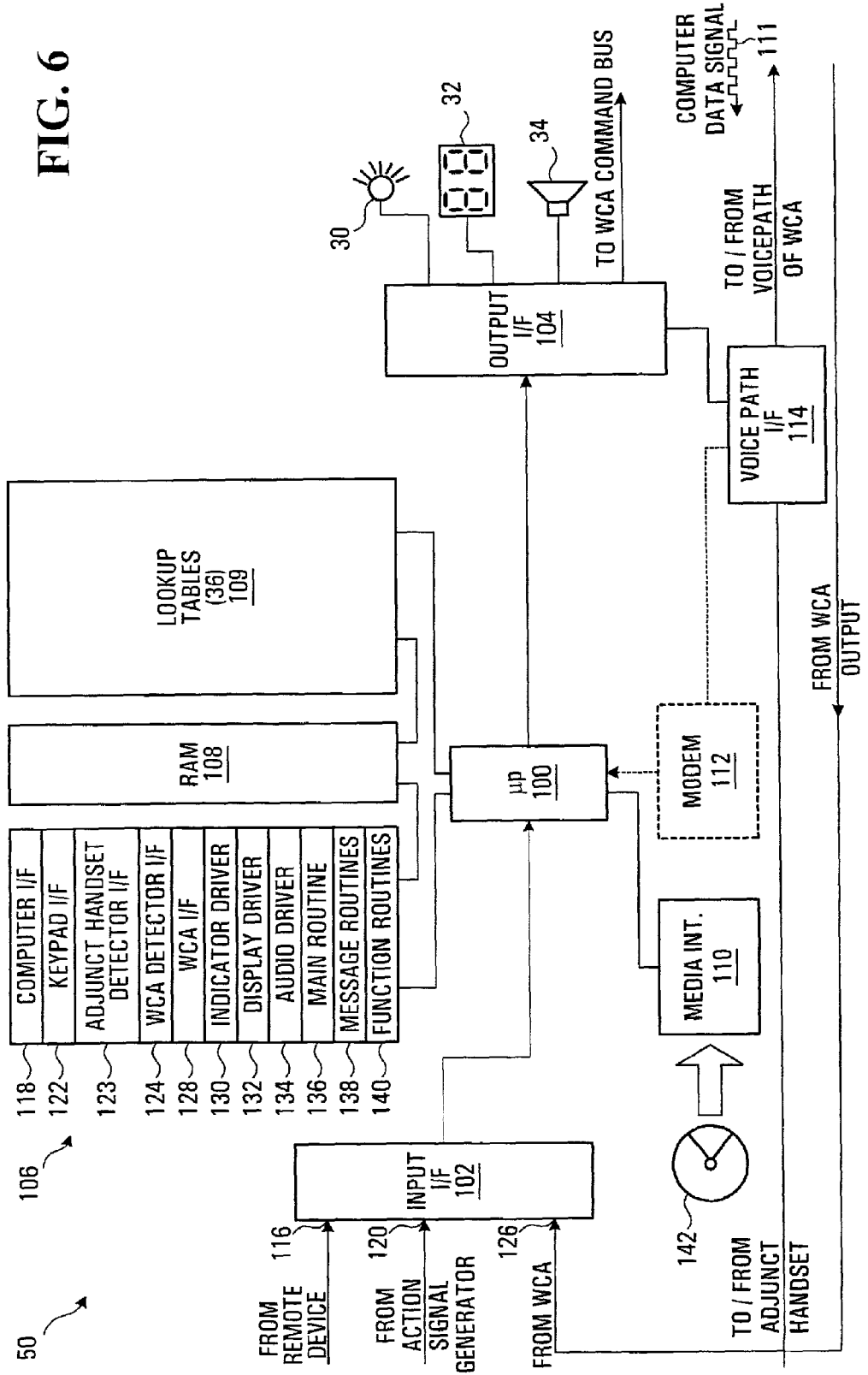
FIG. 6 is a block diagram of a microprocessor circuit used to implement the apparatus shown in FIG. 1.

Referring to FIG. 6, the processor circuit 50 is shown in greater detail. In this embodiment, the processor circuit 50 includes a main processor 100, input and output interfaces 102 and 104 respectively, program memory 106, random access memory 108 and lookup table memory 109 and may include a computer readable media interface 110 and/or a modem shown in broken outline at 112. The processor circuit 50 may further include a voice path interface 114 controlled by the main processor 100 for a connecting the adjunct handset 62 to the voice path (not shown) of the WCA 56 through the contacts 72 shown in FIG. 3.

Still referring to FIG. 6, the input interface 102 is operable to receive action signals from a plurality of different devices. Consequently, the input interface 102 has a first input 116 for receiving signals from a remote device such as a computer, for example. To facilitate receipt of such signals, the program memory 106 may be configured with a computer interface driver 118 which effectively causes the processor circuit 50 to act as the action signal receiver 26 shown in FIG. 1 to produce an action signal. In addition, the input interface 102 includes an input 120 for receiving signals from the keypad 58 shown in FIG. 2 and from the micro switch 80 shown in FIG. 3. Consequently, the program memory 106 may include a keypad interface 122, an adjunct handset detector interface 123 and a WCA detector interface 124 each of which acts as an action signal generator of the type shown at 22 in FIG. 1. The input interface 102 may further include an input 126 for receiving signals directly from the contacts 72 shown in FIG. 3 to receive signals and information from the WCA 56 and thus the program memory may include a wireless communications input interface 128 which causes the processor circuit 50 to act as the receiver 24 shown in FIG. 1 to produce action signals representing signals received from the WCA.

The output interface 104 is operable to supply signals to the indicator 30, the display 32 and the speaker 34 and thus, the program memory 106 includes an indicator driver, a display driver and an audio driver 130, 132 and 134 respectively. The program memory 106 is also loaded with a main routine 136 a plurality of message producing routines 138 and a plurality of adjunct function routines 140. Effectively, the message producing routines 138 map action signals including incoming signals form the remote device, locally produced action signals and signals from the WCA 56 into messages recognizable by the adjunct function routines 140 or the WCA 56. The mapping of such signals to such messages may be done in conjunction with reference to any of the WCA lookup tables 36 shown in FIG. 1, to map certain action signals to certain messages understandable by the WCA 56 with which the base 52 is to be used.

The above indicated interfaces, drivers and routines stored in the program memory 106 are effectively different blocks of computer readable code representing instructions for directing the processor circuit 50 to carry out the intended functionality of the interfaces, drivers and/or routines. These codes may be supplied to the microprocessor circuit 50 by way of the media interface 110 which may be operable to read the codes from a compact disk (read only memory) CD-ROM 142, for example. Alternatively, the codes may be received in a computer data signal 111 received by a modem 112, from the choice path of the WCA 56 or from a data output on the WCA. Alternatively, the codes may be supplied in a pre-programmed or electrically programmable read-only memory which acts as the program memory 106 of FIG. 6, for example.

The program memory 106 may include a boot portion (not shown), that automatically "boots up" the main processor 100 when power is applied to the processor circuit 50 and this may cause the processor to invoke a reprogramming routine (not shown) which directs the processor to enable the voice path interface 114 to permit signals to be received from the voice path of the WCA. At the same time, the programming routine may cause the modem 112 to be enabled to receive data signals from the voice path of the WCA, through the voice path interface 114. If such signals are received, the reprogramming routine may direct the main processor 100 to decode the incoming signals to determine whether or not they relate to data packages containing codes for any of the above indicated interfaces, drivers or routines. In this manner, replacement interfaces, drivers and routines replacing the interfaces, drivers and/or routines described above may be received from the WCA which itself receives such routines as data signals from a central computer (not shown) connected to a public wireless network, for example. Thus, a user of the base 52 may make a request to a service provider which is able to supply such replacement routines, and the service provider simply dials up or otherwise establishes a connection with the WCA 56. Or a user may use the WCA 56 to dial up a server to establish a connection, to permit a standard data transfer to occur between the service provider and the WCA, the data transfer including data packages containing the requested replacement interfaces, drivers or routines as the case may be. The data package could even contain all of the interfaces, drivers or routines or any subset thereof to permit the functionality of the base 52 to be updated, on changed or configured at any time.

Operation

Referring to FIGS. 1 and 6, action signals may be produced in a variety of ways. When a signal is received at any of the inputs 116, 120 or 126, the appropriate interface, driver or routine 118, 122, 124 or 128 is executed by the main processor 100 to effectively format the received signal into an action signal. For example, the computer interface driver 118 may exchange handshaking signals with the remote computer and ultimately produce a file, word, byte, or bit, for example, as the action signal. These entities may be stored in the random access memory 108, as the action signal, for example. Receiving a communication from a remote computer may be regarded as an event.

Alternatively, an action signal may be generated by other routines running on the main processor 100, in response to the occurrence of certain other events at the adjunct apparatus 10.

If the received signal is from the keypad 58 shown in FIG. 2, the keypad interface 122 may provide keypad scanning features which ultimately cause a file, word, byte or bit representing a key press, to be stored in the random access memory 108 as being representative of an action signal. The adjunct handset interface 123 and WCA detector interface 124, may include de-bounce functions which may remove the bounce effect of the micro switch 80 and produce a file, word, byte or bit representing whether or not the corresponding detector has been actuated. The WCA input interface 128 may act to strip off any extraneous bits from the data received from the WCA 56 and deposit only the necessary components of the received data from the WCA into the random access memory 108 as an action signal.

Whenever any of the above indicated interfaces provides a representation of an action signal, an action signal interrupt signal is produced in response thereto, and is provide to the processor 100 to invoke operation of the main routine 136.

Figure 7:
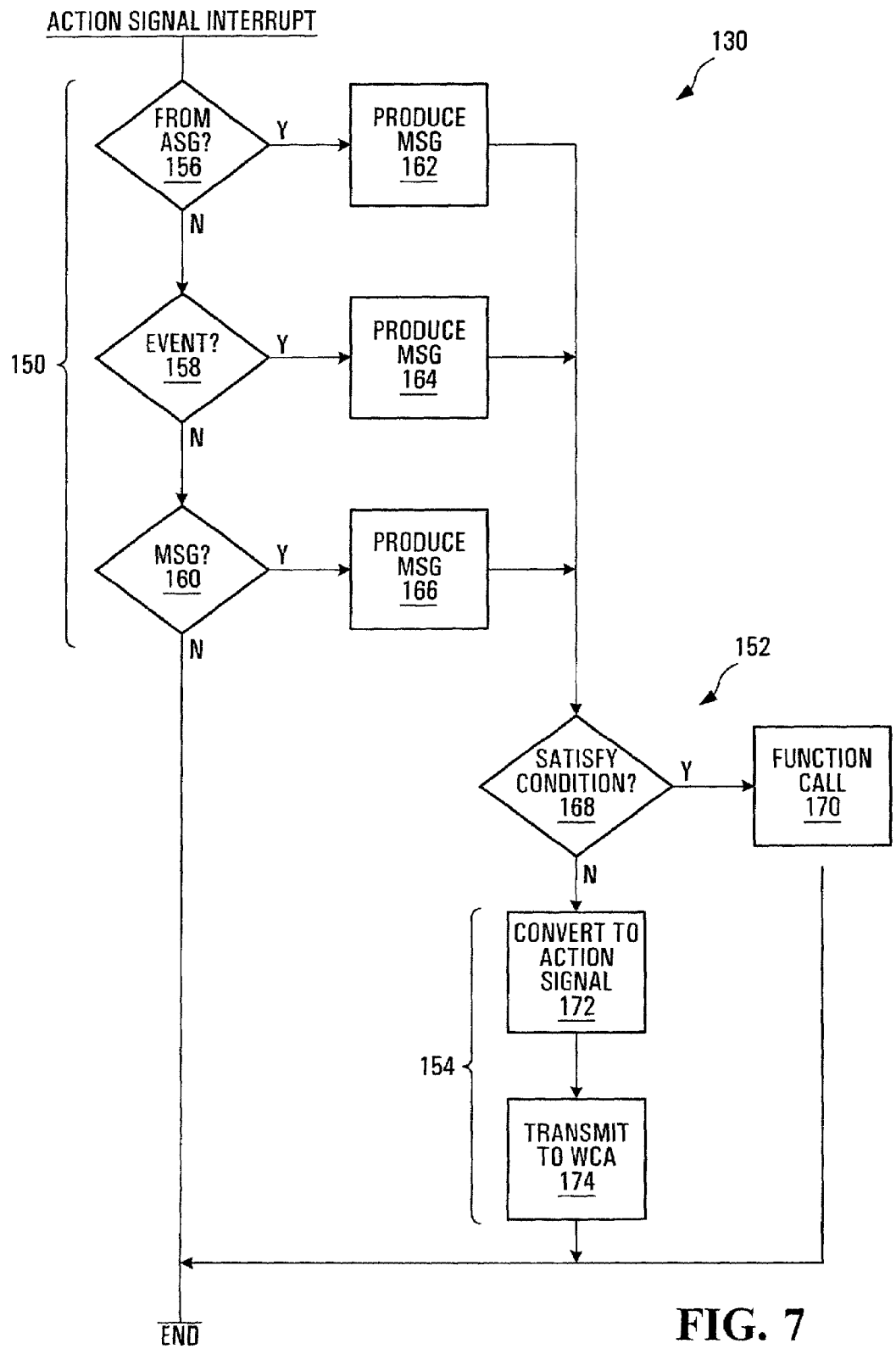
FIG. 7 is a flowchart of a main routine executed by the processor circuit shown in FIG. 5.

Referring to FIG. 7, the main routine 136 is shown generally at 130 and includes a message signal generation portion 150 a functional block implementation portion 152 and a transmitter portion shown generally at 154. These portions effectively correspond to the message signal generator 12, the adjunct functional block 14 and the transmitter 16, respectively shown in FIG. 1.

Referring to FIGS. 1, 5 and 6, the message signal generation portion 150 includes blocks 156, 158 and 160 that determine the source of the action signal. This portion 150 also includes message producing blocks 162, 164 and 166 that produce messages having the address portion 18 and the payload portion 20, of the message signals described herein, depending upon the source of the action signal. The blocks 162, 164 and 166 may be implemented by further blocks of code (not shown) stored in the program memory 106, which act as subroutines called by the main routine 136.

Whenever a message signal is produced, block 168 directs the processor circuit 50 to determine whether or not the address portion 18 of the message signal satisfies a predefined condition. The predefined condition may be a predefined bit sequence or bit, for example, and satisfying the condition may be deemed to have occurred when the bit sequence or designated bit in the address portion of the message matches the bit sequence of a reference bit sequence or matches a predefined bit. Thus, when the condition is satisfied, block 170 directs the processor circuit 50 to execute a function call for a function defined in the payload portion 20 of the message. Thus, the payload portion 20 includes a bit sequence or code identifying a particular function to be executed by the adjunct apparatus 10. This function may be implemented by blocks of code stored as a function routine in the plurality of function routines 140 in the program memory 106.

As indicated earlier, exemplary functions may include actuating the indicator 30, the display 32, or the speaker 34, shown in FIG. 6, or to connect the handset to the voice path through the voice path interface 114, for example.

If at block 168 the address portion 18 of the message signal does not satisfy the condition, block 172 directs the processor circuit 50 to cause the message signal to be converted into a signal having voltage levels, timing and a format readable by the WCA 56. Such conversion may be facilitated by accessing the lookup tables 36 stored in the lookup table memory 109 shown in FIG. 6.

After converting the message signal into the appropriate format, block 174 directs the processor circuit 50 to transmit the action signal to the WCA 56 and the main routine 136 is then ended.

The effect of the main routine 136 is that a user, for example, may lift the adjunct handset 62 shown in FIG. 2 and actuate a button on the keypad 58, or a sequence of keypad buttons to cause the keypad interface 122 shown in FIG. 6 to be invoked to cause the processor circuit 50 to produce an action signal. The main routine 130 would then direct the processor circuit 50 to interpret this action signal as being from an action signal generator 22 and cause the processor circuit to produce a message having an address portion 18 which does not satisfy the condition and which has a payload portion 20 specifying a command recognizable by the WCA 56 shown in FIG. 2. The command may be of a type that causes the WCA to place an outgoing call over a wireless communication network to which it subscribes. The processor circuit 50 may also produce a message having an address portion 18 that does satisfy the condition and that has a payload portion 20 specifying an adjunct function that actuates the voice path interface 114 to connect the adjunct handset 62 to the voice path of the WCA 56. Thereafter, to the user, the apparatus shown in FIG. 2 appears to function like a normal landline telephone.

Figure 4:
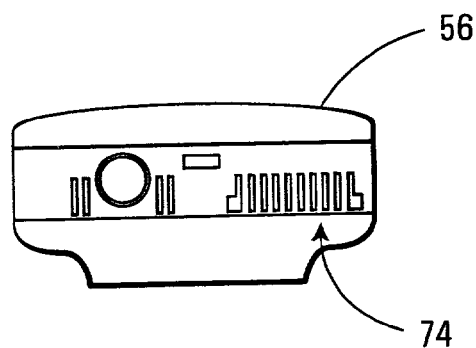
FIG. 4 is a bottom view of a prior art cellular telephone.

Similarly, if an incoming call is received by the WCA 56, the WCA may present signals at the contacts 74 shown in FIG. 4, which are ultimately received at input 126 of the input interface 102 shown in FIG. 6 to cause an action signal to be produced and stored in the random access memory 108. In this instance, block 160 of the main routine may detect that the action signal is from the WCA 56 and invoke block 166 to produce a message having an address portion 18 satisfying the condition and having a payload portion 20 identifying a function that causes the output interface 104 to cause the speaker 34 to emit an audible tone to indicate ringing, similar to a landline based telephone. Then, should the user lift the adjunct handset 62, the removal of the handset from the handset receptacle 60 may be detected by the adjunct handset detector 63 to produce an action signal received at the action signal input 120 of the input interface 102 shown in FIG. 6. Such action signal may be stored in the random access memory 108 and block 156 of the main routine 136 may detect that the message is from an action signal generator 22 and thereby invoke block 162 to cause a message having an address portion 18 satisfying the condition and having a payload portion 20 identifying a function that causes the output interface 104 to actuate the voice path interface 114 shown in FIG. 6 to connect the adjunct handset 62 to the voice path of the WCA 56 through the contacts 72 shown in FIG. 3 and the contacts 74 shown in FIG. 4. To the user, the apparatus appears to operate similar to the way a landline based telephone operates.

A similar procedure may be invoked whereby when the WCA receives a short messaging service (SMS) or text message, the WCA causes signals to be presented at the contacts 74 ultimately causing the processor circuit 50 to display the SMS or text message on the display 32.

In addition, certain keys of the keypad 58 shown in FIG. 2, or key sequences, may be used and interpreted to invoke certain functions of the WCA 56. For example, the actuation of a particular key of the keypad 58 may be associated with access to a user contact directory stored in the WCA 56, which would normally be accessed by pressing a similar key on the WCA. Thus, a key press on the keypad 58 of the base 52 may invoke a function of the WCA 56 that can already be invoked by actuation of an actuator on the WCA. Furthermore, the base 56 may be used to set the WCA 56 into a mode in which retrieved directory entries are encoded in signals presented at the contacts 74 and these signals may be detected at the input 126 of the input interface 102 which are interpreted by the WCA input interface 128 to produce an action signal which may be interpreted by the main routine 136 shown in FIG. 7 to invoke an adjunct function that causes the information contained in such signals to be displayed on the display 32 shown in FIGS. 2 and 6.

In addition, the base 52 may be used advantageously with WCAs having predictive text features. For example, a particular key or key sequence on the base 52 may cause the action signal generator 22 to produce an action signal representing a request for use of a predictive text engine in the WCA 56. In this case, block 162 causes message signals to be produced in which the address portion 18 is set to cause the message to be transmitted to the WCA 56 and the payload portion 20 contains a command recognizable by the WCA as a request to use the predictive text engine in the WCA.

In response to a subsequent key press on the keypad 58, for example, message signals having a payload portion representing the key press may be passed in a similar manner to the predictive text engine in the WCA 56, which may respond by producing signals that are received at the input 126 and interpreted by the WCA interface 128 to cause it to produce action signals that cause the messaging producing block 166 to produce a message for receipt by the function call block 170 to cause invocation of a function that causes a selection of words or symbols offered by the predictive text engine of the WCA to be displayed on the display 32. This process may be repeated as more and more letters or symbols are entered by the user to allow the user to use the predictive text engine in the WCA 56 without actually pressing buttons on the WCA, but rather pressing keys on the keypad 58 on the base 52, while observing the results of the predictive text engine in the WCA on the display 32. Thus, the apparatus has the appearance of a landline telephone having the predictive text feature of the WCA.

Once a desired sequence of predictive words has been obtained, the user may actuate another key or key sequence on the keypad 58 to cause a short messaging service (SMS) message or text message to be produced, the SMS or text message including the sequence of predicted words selected by the user. The actuation of key presses invoking the production of the SMS or text message may be interpreted by the message producing block 162 as a request to produce an SMS or text message and the message producing block 162 may refer to the lookup tables 36 to find conversion parameters to convert the SMS or text message into a message in accordance with a mobile wireless standard such as the Global System for Mobile Communications GSM standard and use this information to produce a message having an address portion that causes to be transmitted to the WCA 56 and having a payload portion bearing a command directing the WCA to send a GSM message in accordance with the GSM standard, over the wireless communication link to which it subscribes.

In another use of the apparatus, the message producing block 164 shown in FIG. 7 may act to cause a message to be produced in response to receipt of the WCA 56 in the receptacle 54 as detected by the micro switch 80 shown in FIG. 3. The message may include an address portion causing the message to be directed to the WCA, and a payload portion containing a command directing the WCA to transmit a signal to a base station of the wireless network, to inform equipment in communication with the base station that the WCA 56 has been received in the receptacle 54. Detection of this message by equipment in communication with the wireless network base station may be used to signal a change in available subscriber features or a change in billing rates, for example. Alternatively, it may be used to prompt other service providers to send messages to the WCA 56 in such a manner that the processor circuit 50 causes the message to be displayed on a display 32 thereof. The display 32 of the base station may be a relatively large display compared to the display on the WCA, in which case advertising messages can be conveniently displayed on the display 32 of the base 52 in response to detection that the WCA 56 is in the receptacle 54.

In effect, therefore, the keypad 58 on the base 52 may act as a remote control keypad or adjunct to a keypad of the WCA 56 and the display 32 may act as an adjunct display to a display of the WCA. Similarly, it will be appreciated from the foregoing, that the apparatus facilitates the use of the adjunct handset 62 as an adjunct to the handset incorporated within the WCA 56, thereby permitting users to employ all of the features of the WCA while appearing to use a landline-type handset, and while permitting control of the WCA with a keypad of the size and feel of a typical landline telephone base. In general, the base 52 and adjunct handset 62 provide the look and feel of a landline telephone while providing wireless service and features. Different WCAs may be used with the same base 52, at different times since the base only acts as an adjunct to whatever WCA is received in the receptacle or, more generally, is connected to the contacts 72 or, even more generally, in communication with the processor circuit 50.

The above-described example is provided on the assumption that the WCA 56 is a cellular telephone. Where the WCA 56 is a personal data organizer, for example, the adjunct apparatus 10 may not need the handset receptacle 60 or the adjunct handset 62 and may provide merely the remote control and display functions described above.

Figure 8:
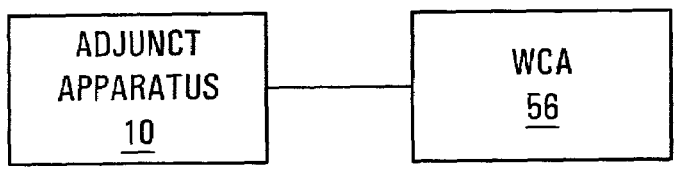
FIG. 8 is a block diagram showing a system comprised of a base of the type shown in FIG. 2 or 5 and a wireless communication appliance.

Referring to FIG. 8, it will be appreciated that in the description of the apparatus thus far it is contemplated that the adjunct apparatus 10 and WCA 56 together form a communications device wherein the adjunct apparatus 10 acts as an adjunct to the WCA 56.

Figure 9:
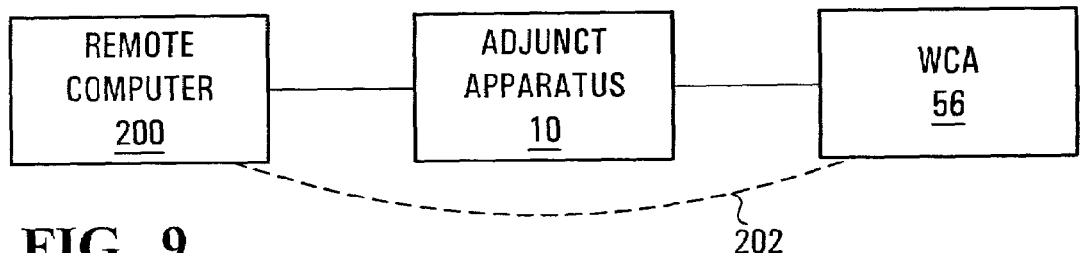
FIG. 9 is a block diagram of a system comprising the system shown in FIG. 8 and a remote computer.

Referring to FIG. 9, it was mentioned above that the base 52 may receive signals from a remote computer 200. Such a configuration is shown in FIG. 9. As described above, data may be transferred from the remote computer 200 to the adjunct apparatus 10 using the action signal receiver 26 shown in FIG. 1, and the adjunct apparatus 10 may send messages containing such data to the WCA 56 in the manner described above. However, alternatively, a direct data connection shown generally at 202 in FIG. 9 may be provided between the remote computer 200 and the WCA 56 while at the same time maintaining the connection between the remote computer 200, the adjunct apparatus 10 and the WCA 56. In effect, the maintained connection may be used to control the WCA, whereas the direct data connection 202 may be used simply to transfer data. Thus, in this embodiment there are separate data and control paths.

The main routine 136 may be incorporated into the remote computer 200 and the remote computer 200 may have action signal generator modules to produce action signals interpretable by the main routine 136. Then, the main routine 136 at the remote computer may produce message signals with address portions 18 and payload portions 20 as described above. If, as a result of running the main routine 136, an action signal is transmitted toward the WCA 56 as indicated at block 174 in FIG. 7, this action signal may be received at input 116 of the input interface 102 of the processor circuit 50 shown in FIG. 2. This may cause the main routine 136 being executed by the processor circuit 50 at the adjunct apparatus 10 to simply pass the action signal through at block 164, without modifications, assuming the action signal is already in the address/payload format of a message of the type described herein. Thus, the signal produced by the remote computer 200 may effectively be relayed by the adjunct apparatus 10 to the WCA 56. Similarly, signals produced by the WCA 56 may be relayed by the adjunct apparatus 10 to the remote computer 200. Thus, the adjunct apparatus 10 may act as both a desktop interface and a computer interface to a WCA 56. More generally, the method described herein may be incorporated into other adjunct devices and such devices may be daisy-chained together so that messages can ripple from the furthest downstream device to an upstream WCA 56 through intermediate adjunct apparatuses of the types described herein.

Figure 10:
FIG. 10 is a block diagram of an alternate embodiment of the system shown in FIG. 9.

Referring to FIG. 10, the adjunct apparatus 10 and the remote computer 200 of FIG. 9 may be swapped, and if the computer is provided with the main routine 136 shown in FIG. 7, the remote computer may be used to relay control and data signals between the base 52 and the WCA 56 while at the same time itself having the ability to control the WCA. It will also be appreciated that the adjunct apparatus 10 may also be programmed with routines that enable it to produce commands recognizable by the remote computer 200, thereby enabling the base to control the remote computer as well as the WCA 56.

While specific embodiments of the invention have been described and illustrated, such embodiments should be considered illustrative of the invention only and not as limiting the invention as construed in accordance with the accompanying claims.

What is claimed is:

1. A method of controlling a wireless communication appliance, the method comprising:
   producing a message signal comprising an address portion and a payload portion, in response to an action signal received at an adjunct apparatus;
   causing said adjunct apparatus to perform a function identified in said payload portion when said address portion satisfies a condition; and
   transmitting said message signal to said wireless communication appliance when said address portion fails to satisfy said condition.

2. The method of claim 1 further comprising receiving said action signal at said adjunct apparatus.

3. The method of claim 2 wherein receiving comprises receiving said action signal from a remote device.

4. The method of claim 3 wherein receiving said action signal from a remote device comprises receiving said action signal from a remote computer.

5. The method of claim 1 further comprising producing said action signal at said adjunct apparatus.

6. The method of claim 5 wherein producing said action signal comprises detecting actuation of a switch at said adjunct apparatus.

7. The method of claim 5 wherein producing said action signal comprises detecting engagement of the wireless communication appliance with a receptacle on said adjunct apparatus.

8. The method of claim 7 wherein producing a message signal comprises producing a message signal having an address portion that does not meet said condition and having a payload portion representing a command operable to cause the wireless communication appliance to transmit a home signal to indicate that the wireless communication appliance is engaged with said receptacle.

9. The method of claim 1 wherein producing a message signal comprises including in said payload portion a command operable to control said wireless communication appliance.

10. The method of claim 9 wherein including further comprises representing a command operable to cause said wireless communication appliance to perform a function operable to be invoked by an actuator on said wireless communication appliance.

11. The method of claim 1 wherein transmitting said message signal comprises causing electrical signals to be produced at a control interface of said wireless communication appliance.

12. The method of claim 1 wherein transmitting said message signal comprises causing electromagnetic energy to be radiated for reception by said wireless communication appliance.

13. The method of claim 1 wherein producing a message signal comprises producing a message signal such that said address portion does not satisfy said condition and such that said message signal has a payload portion identifying a function that causes the wireless communication appliance to employ a predictive text engine thereof.

14. The method of claim 1 further comprising receiving said action signal from said wireless communication appliance.

15. The method of claim 14 wherein receiving said action signal comprises receiving an indicator signal from said wireless communication appliance.

16. The method of claim 15 wherein producing comprises producing a message signal such that said address portion satisfies said condition and having a payload portion identifying a function that causes said adjunct apparatus to actuate an indicator on said adjunct apparatus to indicate information received from said wireless communication appliance.

17. The method of claim 16 further comprising actuating said indicator at said adjunct apparatus.

18. The method of claim 17 wherein actuating an indicator comprises actuating a light emitting device on said adjunct apparatus.

19. The method of claim 17 wherein actuating an actuator comprises actuating a display on said adjunct apparatus.

20. The method of claim 17 wherein actuating an indicator comprises actuating a sound producing device on said adjunct apparatus.

21. An adjunct apparatus for a wireless communication appliance, the apparatus comprising:
- a message signal generator operable to produce a message signal comprising an address portion and a payload portion, in response to an action signal received at said adjunct apparatus;
- a functional block operable to perform a function indicated by said payload portion when said address portion satisfies a condition; and
- a transmitter operable to transmit said message signal to said wireless communication appliance when said address portion fails to satisfy said condition.

22. The apparatus of claim 21 further comprising a receiver operable to receive said action signal at said adjunct apparatus.

23. The apparatus of claim 22 wherein said receiver is operable to receive said action signal from a remote device.

24. The apparatus of claim 23 wherein said receiver is operable to receive said action signal from a remote computer.

25. The apparatus of claim 21 further comprising a signal generator operable to produce said action signal at said adjunct apparatus.

26. The apparatus of claim 25 wherein said signal generator comprises a switch.

27. The apparatus of claim 25 wherein said apparatus comprises a base having receptacle for engaging the wireless communication appliance.

28. The apparatus of claim 27 wherein said base has an appearance of a land line telephone base.

29. The apparatus of claim 28 further comprising an adjunct handset operable to interlace with a voice path in the wireless communication appliance to permit said handset to be used as an alternative to a handset in the wireless communication appliance.

30. The apparatus of claim 29 wherein said base has a handset receptacle for receiving and holding said adjunct handset.

31. The apparatus of claim 27 wherein said signal generator comprises a detector operable to detect engagement of the wireless communication appliance with said receptacle.

32. The apparatus of claim 31 wherein said message signal generator is operable to produce a message signal having an address portion that does not meet said condition and having a payload portion representing a command operable to cause the wireless communication appliance to transmit a home signal to indicate that the wireless communication appliance is engaged with said receptacle.

33. The apparatus of claim 21 wherein said message signal generator is operable to include in said payload portion a command operable to control the wireless communication appliance.

34. The apparatus of claim 33 wherein said message signal generator is operable to include in said payload portion a representation of command operable to cause the wireless communication appliance to perform a function operable to be invoked by an actuator on the wireless communication appliance.

35. The apparatus of claim 21 further comprising an interface in communication with said transmitter and operable to engage with a control interface of the wireless communication appliance to cause electrical signals representing said message signal to be produced at said control interface.

36. The apparatus of claim 21 wherein said transmitter comprises an electromagnetic transmitter operable to radiate electromagnetic energy representing said message signal, for reception by the wireless communication appliance.

37. The apparatus of claim 21 wherein said message signal generator is operable to produce a message signal such that said address portion fails to satisfy said condition and such that said payload portion includes a command operable to invoke a predictive text engine in the wireless communication appliance.

38. The apparatus of claim 21 further comprising a receiver operable to receive said action signal from the wireless communication appliance.

39. The apparatus of claim 38 wherein said receiver is operable to receive an indicator signal from the wireless communication appliance.

40. The apparatus of claim 39 wherein said message signal generator is operable to produce a message signal such that said address portion satisfies said condition and such that said payload portion identifies a function that causes said adjunct apparatus to actuate an indicator at said adjunct apparatus to indicate information received from the wireless communication appliance.

41. The apparatus of claim 40 further comprising an indicator operable to indicate information received from the wireless communication appliance.

42. The apparatus of claim 41 wherein said indicator comprises a light emitting device on said adjunct apparatus.

43. The apparatus of claim 41 wherein said indicator comprises a display on said adjunct apparatus.

44. The apparatus of claim 41 wherein said indicator comprises a sound producing device on said adjunct apparatus.

45. An adjunct apparatus for controlling a wireless communication appliance, the apparatus comprising:
- means for producing a message signal comprising an address portion and a payload portion, in response to an action signal received at an adjunct apparatus;
- means for causing said adjunct apparatus to perform a function identified in said payload portion when said address portion satisfies a condition; and
- means for transmitting said message signal to the wireless communication appliance when said address portion fails to satisfy said condition.

46. A computer readable medium for providing codes operable to direct a processor circuit to control a wireless communication appliance, by:
- producing a message signal comprising an address portion and a payload portion, in response to an action signal received at an adjunct apparatus;
- performing a function identified in said payload portion when said address portion satisfies a condition; and
- transmitting said message signal to the wireless communication appliance when said address portion fails to satisfy said condition.

* * * * *